(12) United States Patent
Ferrone

(10) Patent No.: US 12,196,608 B2
(45) Date of Patent: Jan. 14, 2025

(54) LIGHT-OUT DETECTION FOR WAYSIDE SIGNALS

(71) Applicant: Siemens Mobility, Inc., New York, NY (US)

(72) Inventor: Dustin Ferrone, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 18/202,363

(22) Filed: May 26, 2023

(65) Prior Publication Data

US 2024/0393168 A1    Nov. 28, 2024

(51) Int. Cl.
  *G01J 1/42*    (2006.01)
  *B61L 9/04*    (2006.01)
  *G01J 1/04*    (2006.01)

(52) U.S. Cl.
  CPC . *G01J 1/42* (2013.01); *B61L 9/04* (2013.01); *G01J 1/0403* (2013.01); *G01J 2001/4252* (2013.01)

(58) Field of Classification Search
  CPC .... G01J 1/42; G01J 1/0403; G01J 2001/4252; B61L 9/04
  See application file for complete search history.

(56) References Cited

U.S. PATENT DOCUMENTS

| | | | | |
|---|---|---|---|---|
| 2004/0202751 | A1* | 10/2004 | McKay | A23G 3/28 426/112 |
| 2010/0231414 | A1* | 9/2010 | Ballinger | B61L 29/30 340/686.2 |
| 2019/0049079 | A1* | 2/2019 | Switzer | F21S 8/006 |
| 2021/0049904 | A1* | 2/2021 | Zavesky | G08G 1/096783 |
| 2021/0086811 | A1* | 3/2021 | Fox | G01J 1/42 |
| 2022/0390276 | A1* | 12/2022 | Williams | G01J 1/0403 |
| 2022/0418075 | A1* | 12/2022 | Cantzler | H05H 1/2439 |

FOREIGN PATENT DOCUMENTS

| | | | | |
|---|---|---|---|---|
| CA | 2868624 | A1 * | 10/2013 | G02B 1/04 |
| WO | WO-2021045983 | A1 * | 3/2021 | B61L 27/0055 |

* cited by examiner

*Primary Examiner* — Georgia Y Epps
*Assistant Examiner* — Don J Williams

(57) ABSTRACT

A light-out detection device includes a mounting structure with a sensor for measuring a light output, wherein the mounting structure is configured as retrofittable structure to mount at a front side of a signal, a processor board with an actuator, the processor board being operably coupled to the at least one sensor, wherein the processor board is configured to control the actuator such that the actuator switches from a first state to a second state when the measured light output is less than a predefined threshold.

20 Claims, 2 Drawing Sheets

LIGHT-OUT DETECTION FOR WAYSIDE SIGNALS

BACKGROUND

1. Field

Aspects of the present disclosure relate to light-out detection for wayside signals, for example in connection with railroad applications.

2. Description of the Related Art

The railroad industry employs wayside signals to inform train operators, and wayside maintainers, of various types of operational parameters. For example, colored wayside signal lights are often used to inform a train operator as to whether and how a train may enter a block of track associated with the wayside signal light. The status (color) of wayside signal lamps is sometimes referred to in the art as the signal aspect. One simple example is a three color system known in the industry as Automatic Block Signaling (ABS), in which a red signal indicates that the block associated with the signal is occupied, a yellow signal indicates that the block associated with the signal is not occupied but the next block is occupied, and green indicates that both the block associated with the signal and the next block are unoccupied. It should be understood, however, that there are many different kinds of signaling systems. Other uses of signal lights to provide wayside status information include lights that indicate switch position, hazard detector status (e.g., broken rail detector, avalanche detector, bridge misalignment, grade crossing warning, etc.), search light mechanism position, among others.

Light-out detection is a safety feature that alerts the authority or maintenance personnel that a light from a wayside signal aspect has burnt out or failed to light for some other reason. Light-out detection is required in many railroad applications, either due to regulations, or contract requirements. Traditionally, light-out detection is done by measuring current through an incandescent bulb, no current indicating that the light is burnt out or off for some other reason. With the introduction of LED bulbs, the prevailing solution has been to design bulbs for light-out detectability. Depending on the method, this can be cost prohibitive.

SUMMARY

Briefly described, one or more embodiments of the present disclosure provide light-out detection device for a wayside signal, such as a railroad wayside signal.

More specifically, a first aspect of the present disclosure provides a light-out detection device comprising a mounting structure comprising at least one sensor for measuring a light output, wherein the mounting structure is configured as retrofittable structure to mount at a front side of a signal, a processor board comprising at least one actuator, the processor board being operably coupled to the at least one sensor, wherein the processor board is configured to control the at least one actuator such that the at least one actuator switches from a first state to a second state when the measured light output is less than a predefined threshold.

A second aspect of the present disclosure provides a wayside signal comprising a signal head with one or more signal lights, a light-out detection device comprising a mounting structure comprising at least one sensor for measuring a light output, wherein the mounting structure is configured as retrofittable structure to mount at a front side of the wayside signal, a processor board comprising at least one actuator, the processor board being operably coupled to the at least one sensor, wherein the processor board is configured to control the at least one actuator such that the at least one actuator switches from a first state to a second state when the measured light output is less than a predefined threshold.

DETAILED DESCRIPTION

Figure 1:
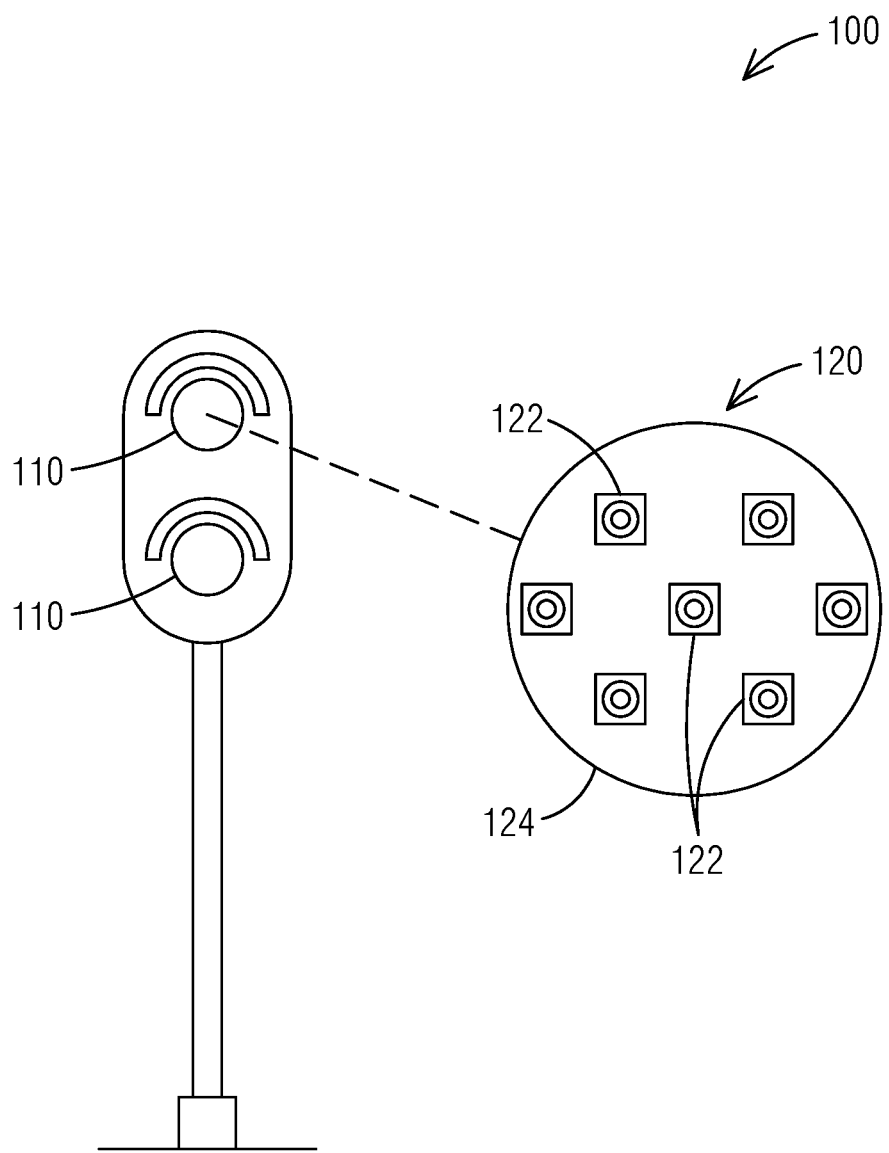
FIG. 1 illustrates a known example of railroad wayside signals in accordance with an exemplary embodiment of the present disclosure.

To facilitate an understanding of embodiments, principles, and features of the present disclosure, they are explained hereinafter with reference to implementation in illustrative embodiments. In particular, they are described in the context of wayside signals, such as railroad wayside signals including light-out detection, in particular retrofittable light-out detection. Like reference numerals represent like elements throughout.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

FIG. 1 illustrates a known example of railroad wayside signals in accordance with an exemplary embodiment of the present disclosure.

FIG. 1 illustrates a railroad wayside signal 100, more specifically a two-aspect signal 100 with aspects/lights 110. Each light 110 comprises a light assembly 120. In an example, the light assembly 120 comprises one or more light source(s) 122 coupled to a base 124. The light source(s) 122 is/are operated by an electronic circuit operated by a control system.

Existing wayside signal lights, such as the crossing lights 110, can include incandescent bulbs or light emitting diodes (LEDs). The benefits of wayside LED signals are improved visibility, higher reliability, and lower power consumption.

In an embodiment, the light source(s) 122 comprise(s) at least one light emitting diode (LED) and the base 124 comprises a LED printed circuit board (PCB). Using one or more LEDs provides smart and low power lamps. The light source(s) 122 and base 124 are positioned in a housing or an enclosure. In the example as illustrated in FIG. 1, the light assembly 120 comprises a plurality of LEDs, in particular a center LED and multiple outer LEDs. The outer LEDs include six LEDs arranged around the center LED with equal distances to each other. Such a configuration may also be referred to as hexapolar configuration. The LEDs are arranged on and supported by a printed circuit board (PCB), e.g. base 124. Of course, the PCB can comprise many other electronic components, such as for example LED driver units, processing units, etc. The LEDs can be for example LEDs with integrated lenses, but many other LED types such as pure chips or packages without lenses can be used. Also, many other configurations for LEDs may be used. Alternatively, the light source 122 can comprise one or more incandescent light bulb(s) with corresponding base(s).

Figure 2:
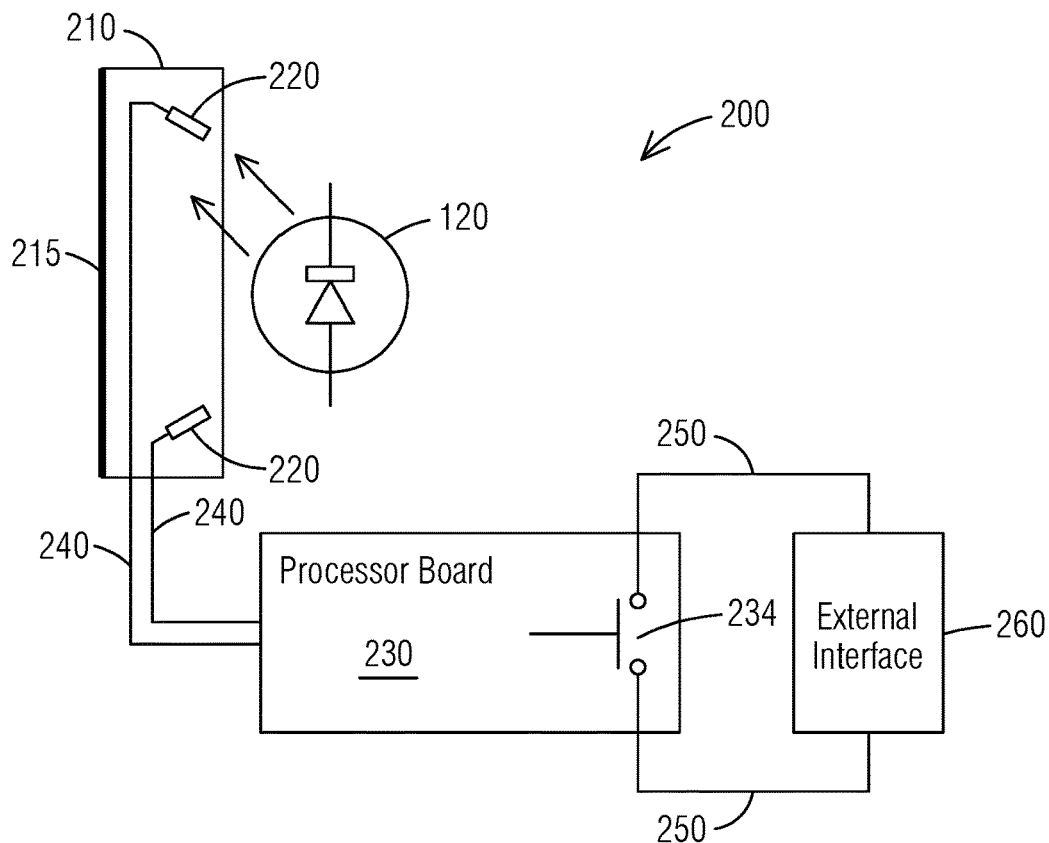
FIG. 2 illustrates a schematic diagram of a light-out detection device in accordance with an exemplary embodiment of the present disclosure.

FIG. 2 illustrates a schematic diagram of an embodiment of a light-out detection device 200 in accordance with an exemplary embodiment of the present disclosure. As described earlier, light-out detection is a safety feature that alerts the authority or maintenance personnel that a light from a wayside signal aspect, such as a light 110 as illustrated in FIG. 1, has burnt out or failed to light for some other reason.

In general, the light-out detection device 200 is a retrofittable device that can be used for different signals or lights that include incandescent lights, or LEDs, or a combination thereof or other types of light emitting units. Instead of focusing on engineered bulbs or measuring a current in the signal, the described light-out detection device 200 is designed to monitor light emitted from the signal, and to determine an ON/OFF state of the light by measuring the emitted light. In case of lights/bulbs using LED array(s), the light-out detection device 200 can be configured to measure partial failure or burnout of the LED-array(s).

More specifically, the light-out detection device 200 comprises a mounting structure 210 comprising at least one sensor 220 for measuring a light output, wherein the mounting structure 210 is configured as retrofittable structure to mount at a light or signal, for example at a front side of a wayside signal. A processor board 230 comprising at least one actuator 234 is operably coupled to the at least one sensor 220. Further, the processor board 230 is configured to control the at least one actuator 234 such that the at least one actuator 234 switches from a first state to a second state when the measured light output changes, for example is less than a predefined threshold. The first state can be an ON state and the second state can be an OFF state. The ON state can correspond to 'light on', i.e. light/signal working properly, and the OFF state can correspond to 'light off', i.e. light/signal not working/failing.

In an embodiment, the mounting structure 210 is configured to carry multiple sensors 220. In an example, the multiple sensors 220 are arranged at a perimeter of the light (aspect) when mounted to the signal. In an example, the mounting structure 210 comprises a signal lens, for example a clear lens, that can be easily mounted at a front side of an existing light. Other examples of retrofittable mounting structures 220 include ring-shaped (circular) structures, or semi-circular structures.

The mounting structure 210 is configured to carry or hold the one or more sensors 220. In an example, the sensor(s) 220 comprise photoresistors, or other types of optical detectors, such as photodiodes, phototransistors, light-dependent resistors, photocells, and a combination thereof. The one or more sensors 220 are arranged such that they can monitor and/or measure the light output produced by the light.

The retrofittable mounting structure 210 can comprise a clip or clamp for mounting the device 200 to the light. In another example, the retrofittable mounting structure 210 comprises an area or surface to receive an adhesive for adhesively mounting the light-out detection device to light, for example gluing to an existing lens of the signal. In yet another example, the retrofittable mounting structure 210 may comprise a magnetic feature for mounting the device 200 to the respective light, or the mounting structure 210 itself may be made of magnetic material.

The light-out detection device 200 further comprises the processor board 230, which is operably coupled to the mounting structure 210, more specifically to the at least one sensor 220. The processor board 230 is coupled via conductors 240, for example via copper conductors, to the sensor(s) 220.

In another embodiment, the processor board 230 is coupled to the mounting structure 210 via one or more fiberoptic cable(s) (conductors 240). In such a case, the one or more sensor(s) 220 are physically located on the processor board 230, and the fiber-optic cable(s)/conductors 240 transmit light signals/pulses to the sensor(s) 220 on the processor board 230.

In another exemplary embodiment, the retrofittable mounting structure 210 comprises a light filter 215 configured to prevent outside light from interference with the at least one sensor 220. The light filter 215 is a one-way filter that prevents outside light from interfering with the sensor(s) 220. The filter 215 can be a film or can be due to a geometry of the mounting structure 210, e.g. lens, itself.

The processor board 230 can be housed either at a signal mast of the wayside signal, or at a location remote to the wayside signal, depending for example on user needs. A remote location is for example an equipment housing, such as a relay room, train control room, wayside housing bungalow, etc., where the processor board 230 can be mounted. A maximum control distance may be determined by a voltage across the at least one sensor 220, e.g. photoresistor (or equivalent) if one is used. If fiberoptic cables are used, cost may be higher, but a maximum remote-control distance can be longer.

The processor board 230 is configured to receive sensor data of the one or more sensor(s) 220 and to utilize the data to control the ON/OFF states (first/second states) of the one or more actuators 234. The actuator(s) 234 can take many forms, but an intended form of actuators for the light-out detection device 200 are actuators that open and close circuits, e.g. optocouplers, solid state relays, etc.

If the light, e.g. light assembly 120, is operating properly, the actuator 234 and associated power circuit is closed (ON state). If the light is not operating properly, i.e. failing and does not emit light above a predefined threshold, the actuator 234 opens, and the power circuit is interrupted. The predefined threshold can be for example that 50% of installed LEDs are operating and emitting light.

Another implementation can be such that opening/closing the power circuit to the light is so that the light is truly OFF (not just partially OFF). This implementation protects against operator confusion and allows for accurate use of check pulses and other typical circuit checks used to determine light-out status.

Another embodiment includes opening/closing a dedicated signal status conductor 250 running from an appropriate power source to the processor board 230, and back to an external interface 260, such as a user's processor board, including a power source. This requires the use of additional conductor(s) 250 but allows for a wider range of user application methods. In an example: A user has a 3-aspect signal, with each aspect equipped with its own light out detection device 200. The user may monitor each aspect individually, via external interface 260, receiving inputs indicating which bulb (light source) is out (OFF). Alternatively, the processor board circuits can be connected, creating a series of actuators 234; meaning that if any one of the lights are in an incorrect state, the user can receive one indication flagging the entire 3-aspect signal (as opposed to the specific bulb on the signal), saving on conductors and inputs.

Figure 3:
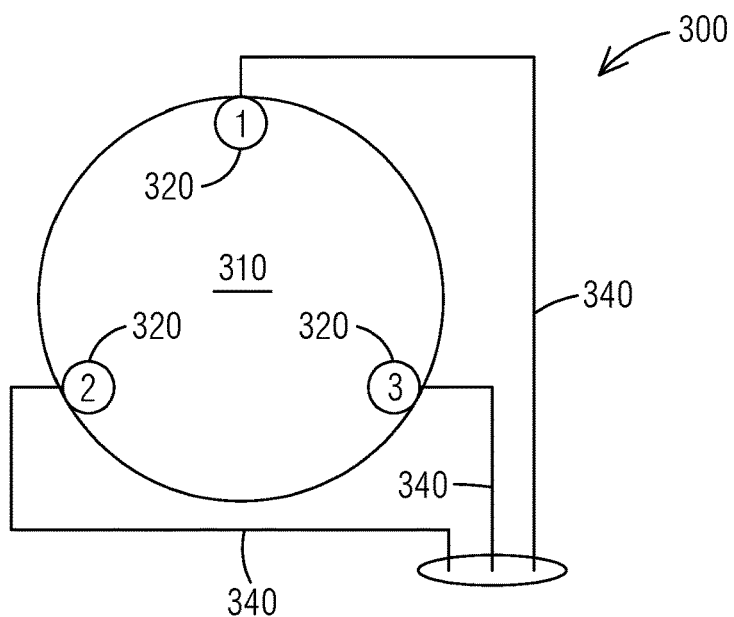
FIG. 3 illustrates a schematic diagram of an exemplary embodiment of a light-out detection device in accordance with an exemplary embodiment of the present disclosure.

FIG. 3 illustrates a schematic diagram of an exemplary embodiment of a light-out detection device 300 in accordance with an exemplary embodiment of the present disclosure. In the example of FIG. 3, the light-out detection device 300 comprises a mounting structure 310 configured as signal lens that can be easily mounted at a front side of an existing light, e.g. crossing light 110. The structure 310 carries multiple sensors 320, specifically three sensors 320 which are arranged at a perimeter of the mounting structure 310 and consequently, when mounted, at the perimeter of the light (aspect).

As noted, the sensor(s) 320 can comprise photoresistors, or other types of optical detectors, such as photodiodes, phototransistors, light-dependent resistors, photocells, and a combination thereof, wherein the conductors 340 can comprise copper. In another embodiment, the sensors 320 and conductors 340 can be fiber-optic cables.

The described light-out detection device 200, 300 is a retrofittable solution that can be used in many light-out detection applications, including incandescent lights, LEDs or other illumination means. Instead of monitoring electrical properties, such as current, light output is monitored using for example fiber-optics, photoresistors, etc. The light-out detection device 200, 300 is inexpensive to produce and easy to install at existing lights/aspects. Further, it should be noted that the described light-out detection device 200, 300 can be used not only for railroad crossing warning devices, but for many other light or lamp applications, for example road traffic or warning lights, within industrial facilities, airport facilities or within building technology applications.

The invention claimed is:

1. A light-out detection device comprising:
a mounting structure comprising at least one sensor configured to measure light emitted from a light source installed in a wayside signal unit, wherein the mounting structure is configured as retrofittable structure to mount at a front side of the light in the wayside signal unit,
a processor board comprising at least one actuator, the processor board being operably coupled to the at least one sensor,
wherein the processor board is configured to control the at least one actuator such that the at least one actuator switches from a first state to a second state when the measured emitted light is less than a predefined threshold.

2. The light-out detection device of claim 1,
wherein the mounting structure is configured to carry multiple sensors, wherein the multiple sensors are arranged at a perimeter of the light of the wayside signal unit when mounted to the wayside signal unit.

3. The light-out detection device of claim 1,
wherein the retrofittable mounting structure comprises a signal lens.

4. The light-out detection device of claim 1,
wherein the retrofittable mounting structure comprises a ring structure.

5. The light-out detection device of claim 1,
wherein the retrofittable mounting structure comprises a clip or clamp for mounting at the front side of the light.

6. The light-out detection device of claim 1,
wherein the retrofittable mounting structure comprises an area or surface to receive an adhesive for adhesively mounting at the front side of the light.

7. The light-out detection device of claim 1,
wherein the retrofittable mounting structure comprises a magnetic component for mounting at the front side of the light.

8. The light-out detection device of claim 1,
wherein the at least one sensor is selected from a photoresistors, a photodiode, a phototransistor, a light-dependent resistor, a photocell, and a combination thereof.

9. The light-out detection device of claim 8,
wherein the processor board is coupled to the at least one sensor via a copper conductor.

10. The light-out detection device of claim 1,
wherein processor board is coupled to the mounting structure via a fiberoptic cable, and wherein the at least one sensor is mounted on the processor board.

11. The light-out detection device of claim 1,
wherein the at least one actuator comprises an optocoupler and/or solid state relay.

12. The light-out detection device of claim 1,
wherein the retrofittable mounting structure comprises a light filter configured to prevent outside light from interference with the at least one sensor.

13. A wayside signal unit comprising:
a signal head with one or more signal lights,
a light-out detection device comprising:
a mounting structure comprising at least one sensor configured to measure light emitted from a signal light source installed in the signal head, wherein the mounting structure is configured as retrofittable structure to mount at a front side of the signal light,
a processor board comprising at least one actuator, the processor board being operably coupled to the at least one sensor,
wherein the processor board is configured to control the at least one actuator such that the at least one actuator switches from a first state to a second state when the measured emitted light is less than a predefined threshold.

14. The wayside signal of claim 13,
wherein the processor board is mounted at a location of the wayside signal unit.

15. The wayside signal of claim 14,
wherein the processor board is mounted in the signal head or a signal mast.

16. The wayside signal of claim 13,
wherein the one or more signal lights comprise light emitting diodes (LEDs).

17. The wayside signal of claim 13,
wherein the retrofittable mounting structure comprises a signal lens.

18. The wayside signal of claim 13,
configured as a railroad signal or traffic signal.

19. The wayside signal of claim 13,
comprising multiple signal lights, wherein each light comprises an individual light-out detection device, and wherein each light is monitored independently.

20. The wayside signal of claim 13,
comprising multiple signal lights, wherein each light comprises one or more sensor(s) for monitoring the light output individually, and
wherein a joint processor board is operably coupled to the one or more sensor(s) and comprises multiple actuators connected in series.

* * * * *